United States Patent [19]

Wardle et al.

[11] Patent Number: 5,099,042

[45] Date of Patent: Mar. 24, 1992

[54] SYNTHESIS OF TETRAFUNCTIONAL POLYETHERS AND COMPOSITIONS FORMED THEREFROM

[75] Inventors: Robert B. Wardle; Jerald C. Hinshaw, both of Logan, Utah

[73] Assignee: Thiokol Corporation, Ogden, Utah

[21] Appl. No.: 323,587

[22] Filed: Mar. 14, 1989

[51] Int. Cl.$^5$ .................. C07C 247/04; C07C 255/02; C07C 43/10; C07C 43/12

[52] U.S. Cl. ..................... 552/11; 149/19.6; 525/410; 528/408; 528/417; 558/447; 558/450; 558/483; 560/182; 560/184; 560/186; 560/252; 562/583; 562/586; 562/587; 564/109; 564/505; 568/614; 568/615; 568/620

[58] Field of Search .................. 552/11; 568/620, 623, 568/614; 560/252; 525/410; 528/408, 417; 558/447, 450, 483

[56] References Cited

U.S. PATENT DOCUMENTS

| | | |
|---|---|---|
| 4,393,199 | 7/1983 | Manser .................. 528/408 |
| 4,405,762 | 9/1983 | Earl et al. ............. 525/410 |
| 4,483,978 | 11/1984 | Manser ................. 528/408 |
| 4,707,540 | 11/1987 | Manser et al. ........ 528/417 |

*Primary Examiner*—Joseph P. Brust
*Attorney, Agent, or Firm*—Madson & Metcalf

[57] ABSTRACT

Polymers are produced from 4 and 5 member cyclic ethers, which polymers have hydroxyl functionalities of 4. The cyclic ethers are polymerized with an acid catalyst and a tetraol initiator having the general formula:

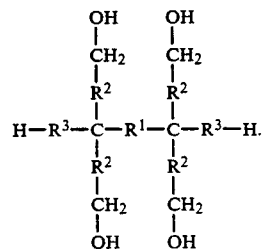

6 Claims, No Drawings

SYNTHESIS OF TETRAFUNCTIONAL POLYETHERS AND COMPOSITIONS FORMED THEREFROM

The present invention is directed to an improved method of carrying out cationic polymerization of cyclic ethers to produce tetrafunctional polymers, particularly cationic polymerization of oxetanes and substituted and unsubstituted tetrahydrofuran. The invention is further directed to cured elastomers formed from such tetrafunctional polymers and to high-energy compositions utilizing such cured elastomers in binder systems.

BACKGROUND OF THE INVENTION

U.S. Pat. Nos. 4,393,199 and 4,483,978, the teachings of which are incorporated herein by reference, are directed to a method of cationic polymerization of cyclic ethers in which a polyhydric alcohol, e.g., a diol, is mixed with a cyclic ether monomer(s) and an acid catalyst. Polyethers formed from oxetane and tetrahydrofuran (THF) monomers are also described, for example, in U.S. Pat. Nos. 4,405,762 and 4,707,540, the teachings of which are incorporated herein by reference.

Polymers produced by cationic polymerization of cyclic ethers are useful for forming cross-linked elastomers. Cross-linked elastomers are useful, for example, as elastomeric binders for high-energy compositions, such as propellants, gasifiers, explosives, or the like. Such high-energy compositions contain a cross-linked elastomer, solid particulates, such as fuel particulates and oxidizer particulates, and may also contain a plasticizer for the elastomer.

Above-referenced U.S. Pat. No. 4,393,199 describes a synthesis of polyoxetane or polyoxetane/tetrahydrofuran polymers by a cationic, living polymer process. Briefly, a polyfunctional alcohol is reacted with an acid, e.g., a Lewis acid, such as boron trifluoride, to form an adduct. This adduct reacts with a cyclic ether, such as an oxetane or tetrahydrofuran (THF), activating the cyclic ether towards attack by an initiator alcohol or polymer terminal alcohol. The terminal end of the cyclic ether residue is an alcohol and, in a similar manner, attaches to a further activated cyclic ether molecule, opening the ring in the process.

Generally, the functionality, particularly hydroxyl functionality, of the polymer which is produced corresponds to the hydroxyl functionality of the alcohol. Thus, if the alcohol is a diol, such as butanediol, the polyether which is produced has an hydroxyl functionality of about 2. If the alcohol is a triol, the polymer has a hydroxyl functionality of about 3. Side reactions or incomplete initiation from all hydroxyl groups may result in a polymer which varies slightly from the functionality of the alcohol precursor.

Cyclic ethers formed from oxetanes or oxetanes plus THF have important potential as binders for high-energy compositions, such as propellants, explosives, gasifiers, or the like. Cured polymers formed from oxetanes and/or THF are elastomeric material and are capable of carrying high levels of particulate materials, such as fuel particulates and/or oxidizer particulates. Depending upon the oxetanes which are used to form the polymers, the high-energy plasticizers may be compatible with high levels of energetic plasticizers, e.g., nitrate ester plasticizers. Most commonly, oxetane and oxetane/THF polymers which have been used to form elastomeric binders difunctional, e.g., having a pair of terminal hydroxyl groups. Such difunctional polymers must be cured with a curing agent, e.g., an isocyanate of functionality substantially higher than two. For example, a mixed isocyanate curative sold under the tradename Desmodur N-100®, having a functionality of about 3.6, is often used to cure difunctional oxetane and difunctional oxetane/THF polymers.

A problem with elastomeric binders formed from oxetane and oxetane/THF polymers is their tendency to have mechanical characteristics less than that which would be desired for a high-energy composition, particularly for a rocket motor propellant. It is especially difficult to provide binders formed from oxetane and oxetane/THF polymers having adequate stress capabilities. Recently, it has been found that better stress capabilities are achieved using trifunctional polymers formed from oxetanes and oxetanes plus THF. It has been considered that even better stress capabilities might be achieved using tetrafunctional polymers; however, successful polymerization of oxetane and oxetane-plus-THF to produce high purity tetrafunctional polymers has not been achieved.

U.S. Pat. No. 4,393,199 suggests polymerization using tetrafunctional alcohol molecules, particularly pentaerythritol. Presumably, a living polymer grown from each hydroxyl group of the pentaerythritol molecule would produce a tetrafunctional polymer. However, it is believed that successful cationic polymerization from pentaerythritol has not been achieved. This is not to say that no molecules of tetrafunctional polymer have been produced by cationic polymerization from pentaerythritol, but that a very substantial proportion of the polymer molecules produced have functionalities less than four. A major problem with using pentaerythritol is its relatively polar nature. For cationic polymerizations, oxygen-containing solvents are generally excluded, requiring the use of substantially non-polar solvents in which pentaerythritol is substantially immiscible. It is further believed that the close proximity of the four hydroxyl groups of pentaerythritol molecule often results in polymer chain initiation from less than all of the four hydroxyl groups.

It is a general object of the present invention to provide tetrafunctional polymers formed from oxetanes and/or tetrahydrofuran.

SUMMARY OF THE INVENTION

In accordance with the invention, polymers having four terminal hydroxyl functions are produced from cyclic ethers, particularly oxetane, substituted oxetanes, tetrahydrofuran and substituted tetrahydrofurans. The tetrafunctional alcohol from which the polymer is grown is relatively non-polar (relative to pentaerythritol) and is, therefore, miscible in organic solvents in which cationic polymerization may be carried out. One suitable preinitiator is the tetraol 2,2'(oxydimethylene)-bis(2-ethyl-1,3-propanediol). Synthesis of a tetrafunctional polymer is promoted by a low ratio of acid catalyst to tetraol; acid catalyst being used at a level of between about 0.05 and about 0.5 equivalents relative to the hydroxyl functional groups of the tetraol, i.e., between about 0.20 and about 2 equivalents per mole of tetraol. The tetrafunctional polymers may be cured, e.g., with polyfunctional isocyanates, to form elastomers. Such elastomers are useful for binder systems for high-energy compositions, such as propellants, explosives, gasifiers, or the like.

DETAILED DESCRIPTION OF CERTAIN PREFERRED EMBODIMENTS

The invention is directed to cationic polymerization of oxetane, substituted oxetanes, tetrahydrofuran, and substituted tetrahydrofurans, i.e., cyclic ethers having 4 and 5 member rings. Suitable substituted oxetanes and tetrahydrofurans are described, for example in U.S. Pat. Nos. 4,483,978 and 4,707,540, the teachings of which are incorporated herein by reference. Polymerizations in accordance with the invention may be conducted with a single monomer species or a mixture of monomer species. It is common, for example, to copolymerize THF and a substituted oxetane monomer.

Oxetane and tetrahydrofuran monomer units used in forming the blocks of the present invention have the general formulae:

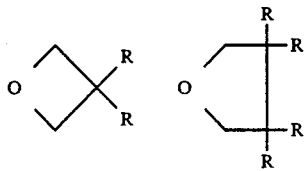

wherein the R groups are the same or different and are selected from moieties having the general formulae: $-(CH_2)_nX$, where n is 0–10 and X is selected from the group consisting of $-H$, $-NO_2$, $-CN$, $-Cl$, $-F$, $-O-$alkyl, $-OH$, $-I$, $-ONO_2$, $-N(NO_2)-$alkyl, $-C\equiv CH$, $-Br$, $-CH=CH$(H or alkyl), $-O-CO-$(H or alkyl), $-CO_2-$(H or alkyl), $-N$(H or alkyl)$_2$, $-O-(CH_2)_{1-5}-O-(CH_2)_{0-8}-CH_3$, and $N_3$.

Examples of oxetanes used in forming block polymers in accordance with the invention include but are not limited to:

| | |
|---|---|
| BEMO | 3,3-bis(ethoxymethyl)oxetane, |
| BCMO | 3,3-bis(chloromethyl)oxetane, |
| BMMO | 3,3-bis(methoxymethyl)oxetane, |
| BFMO | 3,3-bis(fluoromethyl)oxetane, |
| HMMO | 3-hydroxymethyl-3-methyloxetane, |
| BAOMO | 3,3-bis(acetoxymethyl)oxetane, |
| BHMO | 3,3-bis(hydroxymethyl)oxetane, |
| OMMO | 3-octoxymethyl-3-methyloxetane, |
| BMEMO | 3,3-bis(methoxyethoxymethyl)oxetane, |
| CMMO | 3-chloromethyl-3-methyloxetane, |
| AMMO | 3-azidomethyl-3-methyloxetane, |
| BIMO | 3-3-bis(iodomethyl)oxetane, |
| IMMO | 3-iodomethyl-3-methyloxetane, |
| DMO | 3,3-dimethyl oxetane |
| PMMO | 3-propynomethylmethyloxetane, |
| BNMO | 3,3-bis(nitratomethyl)oxetane, |
| NMMO | 3-nitratomethyl-3-methyloxetane, |
| BMNAMO | 3,3-bis(methylnitraminomethyl)oxetane, |
| MNAMMO | 3-methylnitraminomethyl-3-methyloxetane, and |
| BAMO | 3,3-bis(azidomethyl)oxetane. |

In accordance with the invention, the tetrafunctional polymers are grown from a tetrafunctional alcohol which is substantially less polar than pentaerythriol and, therefore, soluble in organic solvents in which polymerization may be carried out. Suitable solvents are non-protic, non-ether, inert solvents. Such solvents include, but are not limited to methylene chloride and chloroform.

Tetraols useful in forming tetrafunctional polymers have the general formulae:

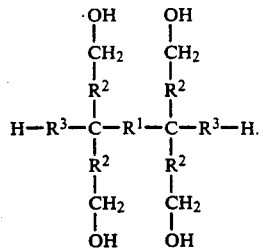

$R^1$ is a non-polar extender, e.g., an alkyl or ethyl moiety. Preferably $R^1$ is saturated. Preferably $R^1$ is a straight chain of from 1 to 3 carbon or oxygen atoms. The $R^2$'s are the same or different and each $R^2$ is either nothing or a non-polar extender, e.g., an alkyl or ether moiety. Preferably $R^2$ is $-CH_2-$ or $-CH_2-CH_2-$. The $R^3$'s are the same of different and each $R^3$ is either nothing or a hydrocarbon chain, preferably saturated. Most preferably $R^3$ is nothing, $-CH_2-$ or $-CH_2-CH_2-$.

An advantage of having a relatively low molecular weight tetraol is that is does not substract significantly from the total energy of the polymer, whereas a larger molecular weight initiator, which is similarly non-energetic, would lower the total energy content of the polymer markedly.

A particular suitable tetraol for use as a preinitiator species is 2,2'(oxydimethylene)bis(2-ethyl-1,3-propanediol) having the chemical formula:

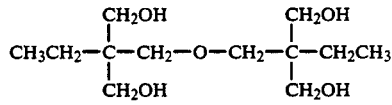

(V. W. Gash, *Journal of Organic Chemistry*, Vol. 37, p. 2197, (1972)). This tetraol is substantially less polar than pentaerythritol and largely dissolves, for example, in methylene chloride and chloroform. Furthermore, the hydroxyl moieties of the tetraol are less bunched together, better enabling cationic polymerization to proceed from each of the hydroxyl moieties.

Although spacing of the hydroxyl groups on the tetraol is desirable, it is at the same time desirable that the molecular weight of the tetraol be relatively low, preferably under about 500, and more preferably, under about 300. It is desirable that the tetraol be as small a part of the polymer as possible so that its residue has only a minor effect on the characteristics of the polymer relative to the effects of the cyclic ether residues. For example, oxetanes may be used having energetic pendant groups in order to contribute to the energy of a high-energy composition; tetraol molecular are substantially less energetic than many energetic oxetanes and therefore detract from the energy of the polymer as a whole.

The acid catalysts may be chosen from among those known in the art, including Lewis acids, such as $AlCl_3$, $BF_3$, $TiCl_4$, $ZnI_2$, $SiF_4$, $SbF_5$, $PF_5$, $AsF_5$, and $SbCl_5$, and strong proton acids, such as $FSO_3H$, $ClSO_3H$, $HClO_4$, $HIO_4$, and $CF_3SO_3H$. The acid catalyst forms an adduct with the tetraol which initiates cationic polymerization.

In accordance with a preferred aspect of the invention, the acid catalyst is used at a much lower level relative to hydroxyl groups of the tetraol than is taught in the prior art. Above-referenced U.S. Pat. No.

4,393,199 teaches that a ratio of diol to a Lewis Acid, i.e., butanediol to $BF_3$-etherate to form a butanediol/$BF_3$ initiator species, should be about 1:2, which is about 1 mole of $BF_3$ for each mole of hydroxyl groups. In Example 6, U.S. Pat. No. 4,393,199 teaches that no polymerization occurs if the ratio of butanediol to $BF_3$ is 1:1. In direct contrast to the teachings of the U.S. Pat. No. 4,393,199, it is discovered that a much more controlled reaction occurs if a Lewis acid is used at a ratio relative to hydroxyl groups of the polyhydric alcohol of 0.5:1 or less, i.e., from about 0.05:1 to about 0.5:1. For a tetraol (functionality 4), the acid catalyst is used at between about out 0.20 to 2 equivalents per mole of tetraol. If a proton acid is used as the initiator, the ratio of hydrogen ions released by the acid catalyst to the hydroxyl groups of the alcohol is from about 0.05:1 to about 0.5:1. By using a substantially lower level of acid catalyst, incorporation of a greater percentage of the preinitiator polyhydric alcohol molecules within polymer molecules is achieved and lower polydispersity is achieved.

A general procedure for polymer synthesis is as follows: The general amount of tetraol is slurried in dry $CH_2Cl_2$. To this is added 0.25 molar eqivalents of $BF_3OEt_2$ (borontrifluoride-etherate). After about 30 minutes, the desired amount of oxetane monomer(s) and/or THF monomers are added dropwise. After the polymerization is judged to be complete, the reaction is diluted with $CH_2Cl_2$ and saturated aqueous $NaHCO_3$. The layers are separated and the aqueous layer washed with $CH_2Cl_2$. The combined organics are dried, and the solvent removed to afford the desired polymer.

Elastomers are formed from the tetrafunctional polyethers by curing with isocyanates having a functionality of at least two, e.g., toluene diisocyanate. A cross-linked density of at least about 10% is generally preferred in an elastomer to be used in a binder. When high energy compositions, such as propellant or explosive grains and produced, curing is effected in the presence of the solids and the plasticizers, whereupon, the solids and plasticizers are dispersed and immobilized throughout the cured binder.

One advantage of using tetrafunctional polymers to form elastomers is that it is frequently possible to use an isocyanate curing agent of low functionality to achieve the desired degree of cross-linking. In curing difunctional polymers, for example, it is common to use a mixed isocyanate curative having a functionality of about 3.5. With tetrafunctional polymers, it is frequently possible to use a difunctional isocyanate, such as toluene diisocyante (TDI) or hexamethylenediisocyanate (HDI). The use of pure curing agents provides for better control of the curing reaction and greater reproducibility.

Propellant compositions comprise between about 50 and about 90 weight percent particulate solids, including fuel material particulates and oxidizer particulates. The balance is substantially all a binder system which comprises the cured elastomeric binder and which may include a plasticizer. A typical particulate fuel material is aluminum. Particulate oxidizer materials include but are not limited to ammonium perchlorate (AP), cyclotetramethylene tetranitramine (HMX), cyclotrimethylene trinitramine (RDX), and mixtures thereof. The invention herein is further intended to encompass high-energy compositions, such as propellant compositions formed from the tetrafunctional polymers.

Depending upon the cyclic ethers which are used to form the polymer, the binder system of the high-energy composition may include an energetic plasticizer, particularly a nitrate-ester plasticizer. Nitrate ester plasticizers include, but are not limited to nitroglycerin (NG); mono-, di-, and triethyleneglycol dinitrate, butanetriol trinitrate (BTTN); and trimethylolethane trinitrate (TMETN). If the polymer is compatible with a nitrate ester plasticizer, amounts of the plasticizer approaching the limits of retention in the binder system may be used. Typically the weight ratio of plasticizer to polymer is up to about 2.5:1.

Various aspects of the invention will now be described in greater detail by way of specific examples.

EXAMPLE 1

Preparation of a Tetrafunctional BAMO/NMMO Polymer

To a stirred solution of 0.25 g (1.00 mmol) of 2,2'(oxydimethylene)bis(2-ethyl-1,3-propanediol) in 24 ml of $CH_2Cl_2$ were added 0.123 ml (1.00 mmol) of boron trifluoride etherate. Nearly all of the tetraol was dissolved at this time. After 20 min, 8.76 g (52.1 mmol) of BAMO and 3.24 g (22.0 mmol) of NMMO were added at one time. After 1 hour more, so undissolved initiator is visible. After 24 hours, a small aliquot was removed and diluted with $CDCl_3$. NMR analysis of this aliquot showed 91.8% conversion of BAMO to polymer (NMMO conversion similar). After 24 hours more, the reaction mixture was diluted with 50 ml of $CH_2Cl_2$ and 25 ml of saturated aqueous $NaHCO_3$. The phases were separated and the aqueous phase was extracted with 50 ml of $CH_2Cl_2$. The combined organics were dried ($MgSO_4$); then the solvent was removed under reduced pressure to afford 11.9 g (97.1%) of a pale yellow oil. The material exhibited the following properties:

| PROPERTY | VALUE |
| --- | --- |
| Target Molecular Weight | 12237 |
| Hydroxyl Equivalent Weight | 2717 |
| NMR Molecular Weight | 11146 |
| Tetraol/Chain | 0.95 |
| Tetraol Incorporated | 0.99 |
| Tetraol Internal | >0.95 |
| GPC Mw | 8650 |
| GPC Mn | 5360 |
| GPC Mw/Mn | 1.61 |

EXAMPLE 2

The following Table summarizes the physical/chemical characteristics of some experimental tetrafunctional; poly-BAMO oxetane polymers. These data show the high degree of initiator incorporation, the molecular weight control, and the functionality achieved with these materials using the tetrafunctional initiator. An additional tetrafunctional BAMO/NMMO copolymer has also been prepared, and its properties are also summarized in the Table (last column). The properties verify that the intended structure was achieved and that a completely controllable and predictable polymerization took place.

The desired overall amorphous character in this tetrafunctional poly-BAMO/NMMO was achieved by the timed addition of NMMO (the more reactive monomer) to the reaction solution containing BAMO (the less reactive monomer) and a portion of the NMMO. The observed relative percentages of BAMO and NMMO incorporated were determined by the feed ratio. Either a methanol or an acetonitrile liquid/liquid extraction is used to purify the polymer, thereby helping to ensure a low extractables content. Please see: R. Wardle and R. Biddle, *A Report on the Synthesis and Scale-Up Chemistry of Polyoxetane Thermoplastic Elastomers*, BRL Contract DAAA15-85-C-0037, 16 Dec. 1987 and J. Simon, U.S. Pat. No. 4,511,742, 1985. Acetonitrile is attractive because residual solvent cannot interfere with cure.

TABLE

TETRAFUNCTIONAL POLYMER PROPERTIES

| Material | BAMO | BAMO | BAMO | BAMO/NMMO |
|---|---|---|---|---|
| Ratio | — | — | — | 71.4/28.6 |
| Target MW | 3,610 | 6,970 | 13,711 | 12,237 |
| VPO MW | 3,902 | 5,860 | 9,574 | 10,548 |
| NMR MW | 4,368 | 5,890 | 10,432 | 11,146 |
| Eq Wt (Titration) | 1,024 | 1,481 | 2,500 | 2,717 |
| Eq Wt (NMR) | 1,092 | 1,575 | 2,760 | 2,858 |
| Init. Inc. (%) | 90 | 100 | 100 | 99 |
| Chains With an Initiator (%) | 100 | 87 | 89 | 95 |
| Mw | 4,270 | 5,410 | 7,840 | 8,650 |
| Mn | 2,620 | 3,310 | 4,420 | 5,360 |
| Polydispersity | 1.63 | 1.63 | 1.75 | 1.61 |
| Functionality (VPO/eq wt) | 3.81 | 3.96 | 3.83 | 3.88 |
| Functionality (NMR) | 4.0 | 3.74 | 3.78 | 3.90 |

The target molecular weight (MW) was determined by dividing the grams of monomer by moles of initiator. The vapor phase osmometry (VPO) molecular weight was measured in chloroform on a Knauer VPO calibrated with benzil using three concentrations of polymer ranging from 10 to 50 g per liter and is corrected for small amounts of oligomer and monomer. The equivalent weight (eq wt) was determined using an isocyanate titration method and by NMR endgroup analysis. The percentage of initiator incorporated (init. inc.) was determined by NMR comparison of the polymer backbone and initiator resonances in the polymer. The percentage of chains with an initiator was determined by NMR comparison of end-group-to-initiator absorbencies. Mw, Mn and polydispersity were determined by GPC using poly(glycol-adipate) as calibration standard with a series of four columns from 100 to 100,000 angstroms employed for separation. Two measures of functionality are given, one based on osmometry and t itration equivalent data and the other on NMR data. Taken in sum, the data in this table constitute irrefutable proof that the materials possess a functionality of four and were synthesized in a controllable manner.

The initiator system results in molecular weight control being influenced strongly by the monomer/initiator ratio and has been shown experimentally to exhibit the characteristics of a "pseudo-living polymerization" mechanism. In a representative polymerization using this method, small aliquots were removed and quenched at several stages of the polymerization. The polymers were analyzed, and analysis gave a profile of the progression of the reaction. The molecular weight was shown to increase linearly with conversion and a high percentage of the initiator was incorporated into the polymer early in the polymerization with exactly one initiator incorporated per polymer chain. These data support a pseudo-living mechanism. Knowing the critical parameters defining the mechanism of the polymerization has enabled both polymer functionality and molecular weight to be controlled, as well as other important polymer parameters (e.g., polydispersity, relative monomer incorporation, and amorphous character). This control has been verified by producing a number of energetic oxetane polymers of varying molecular weight and functionality.

While the invention has been described in respect to certain preferred embodiments, modifications obvious to one with ordinary skill in the art may be made without departing from the scope of the present invention. Various features of the invention are set forth in the following claims.

What is claimed is:

1. A tetrafunctional polymer having four terminal hydroxyl functions comprising the cationic polymerization product of the reaction, in solution and in the presence of between about 0.20 and about 2.0 equivalents per mol of tetraol reactant of an acid catalyst that promotes cationic polymerization of cylic ether monomers, of:

(a) a tetraol having the formula:

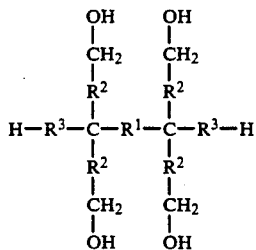

wherein $R^1$ is an ether oxygen or an alkylene radical having from 1 to 3 carbon atoms; the $R^2$'s are the same or different and are each either nothing, an ether oxygen or an alkylene radical and the $R^3$'s are the same or different and are either nothing or a —$CH_2$— or —$CH_2$—$CH_2$— chain, with (b) a cyclic ether monomer selected from oxetane, substituted oxetanes, tetrahydrofuran, substituted tetrahydrofurans and mixtures thereof, said monomer having the formula:

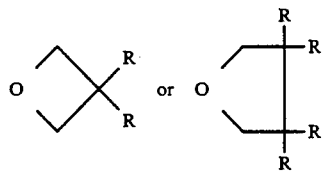

wherein the R groups are the same or different and are selected from moieties having the general formula: —$(CH_2)_n X$, where n is 0–10 and X is selected from the group consisting of —H, —$NO_2$, —CN, —Cl, —F, —O—alkyl, —I, —$ONO_2$, —$N(NO_2)$-alkyl, —C≡CH, —Br, —CH=CH(H or alkyl), —O—CO—(H or alkyl), —$CO_2$—(H or alkyl), —N(H or alkyl)$_2$, —O—$(CH_2)_{1-5}$—O—$(CH_2)_{0-8}$—$CH_3$, and $N_3$.

2. A tetrafunctional polymer according to claim 1 wherein said tetraol is 2,2'(oxydimethylene)bis(2-ethyl-1,3-propanediol).

3. A tetrafunctional polymer according to claim 1 wherein the cylic ether monomer is selected from 3,3-bis(azidomethyl)oxetane, 3-nitratomethyl-3-methyloxetane and mixtures thereof.

4. A method of preparing an essentially tetrafunctional polymer having four terminal hydroxyl functions comprising:

(a) providing a tetraol of the general formula:

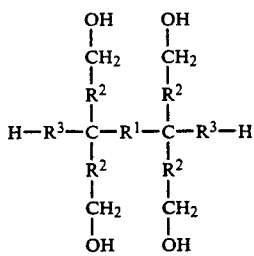

wherein $R^1$ is an ether oxygen or an alkylene radical having from 1 to 3 carbon atoms; the $R^2$'s are the same or different and are each either nothing, an ether oxygen or an alkylene radical and the $R^3$'s are the same or different and are either nothing or a —$CH_2$— or —$CH_2$—$CH_2$— chain, (b) reacting said tetraol with an acid catalyst in an amount of acid catalyst of between about 0.20 and about 2.0 equivalents per mol of tetraol reactant to form an adduct and wherein the acid catalyst is a catalyst that promotes cationic polymerization of cylic ether monomers, and (c) in a suitable solvent, reacting said adduct with a cylic ether monomer selected from oxetane, substituted oxetanes, tetrahydrofuran, substituted tetrahydrofurans and mixtures thereof, said monomer having the formula:

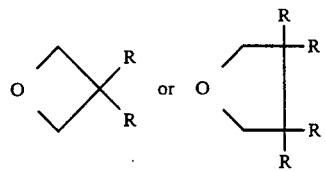

wherein the R groups are the same or different and are selected from moieties having the general formula: —$(CH_2)_nX$, where n is 0-10 and X is selected from the group consisting of —H, —$NO_2$, —CN, —Cl, —F, —O—alkyl, —I, —$ONO_2$, —$N(NO_2)$-alkyl, —C≡CH, —Br, —CH=CH(H or alkyl), —O—CO—(H or alkyl), —$CO_2$—(H or alkyl), —N(H or alkyl)$_2$, —O—$(CH_2)_{1-5}$—O—$(CH_2)_{0-8}$—$CH_3$, and $N_3$, to effect cationic polymerization of said cylic ether monomer from each of the hydroxyl groups of said tetraol.

5. The method according to claim 4 wherein said tetraol is 2,2′(oxydimethylene)bis(2-ethyl-1,3-propanediol).

6. The method according to claim 4 wherein the cylic ether monomer is selected from 3,3-bis(azidomethyl)oxetane, 3-nitratomethyl-3-methyloxetane and mixtures thereof.

* * * * *